Figure 2:
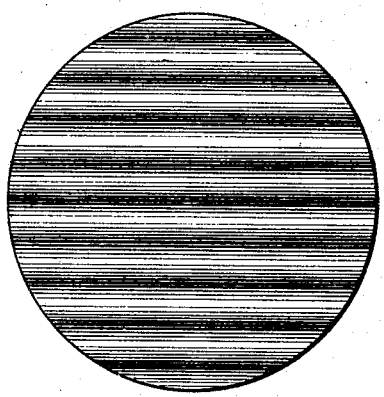
Figure 3:
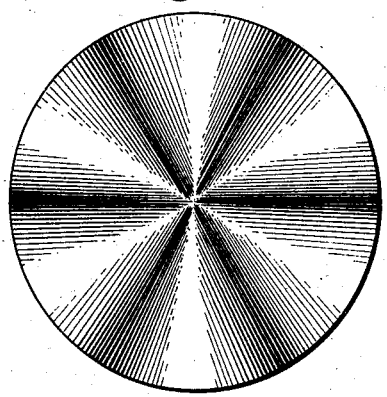
Figure 1:
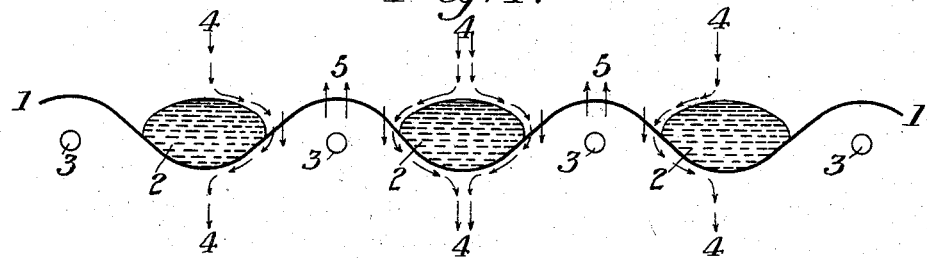
Figure 4:
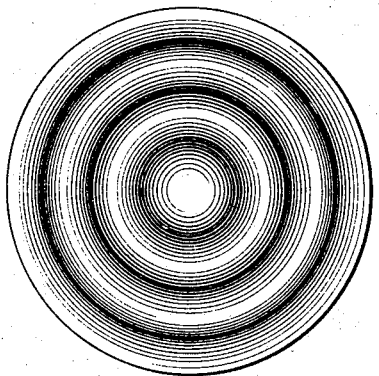
Figure 5:
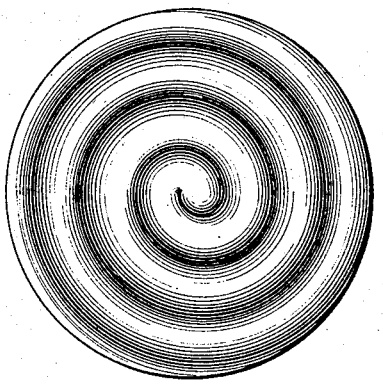

No. 782,308. PATENTED FEB. 14, 1905.
A. WRIGHT.
ELECTROLYTIC APPARATUS.
APPLICATION FILED MAR. 23, 1903.

3 SHEETS—SHEET 1.

Witnesses:
F. T. Chapman,
C. E. Marshall.

Inventor:
Arthur Wright,
By Lyons & Bissing,
Attorneys.

No. 782,308. PATENTED FEB. 14, 1905.
A. WRIGHT.
ELECTROLYTIC APPARATUS.
APPLICATION FILED MAR. 23, 1903.
3 SHEETS—SHEET 2.
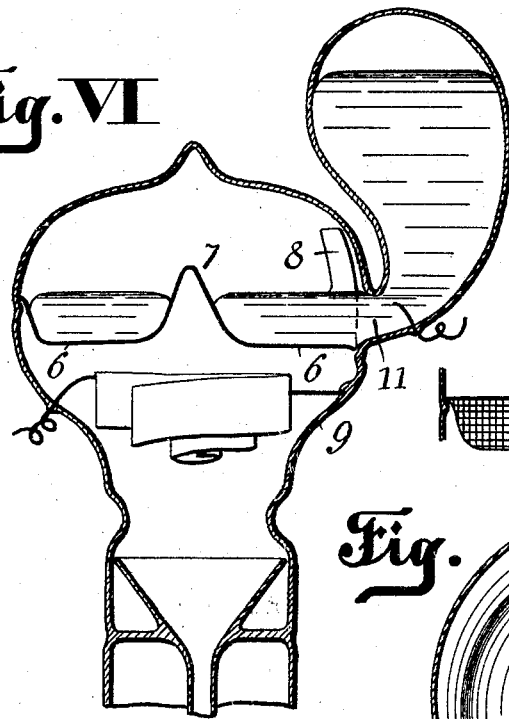
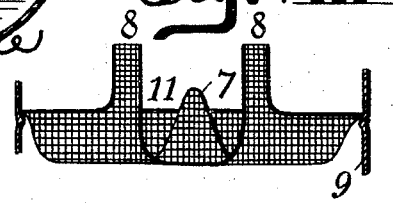
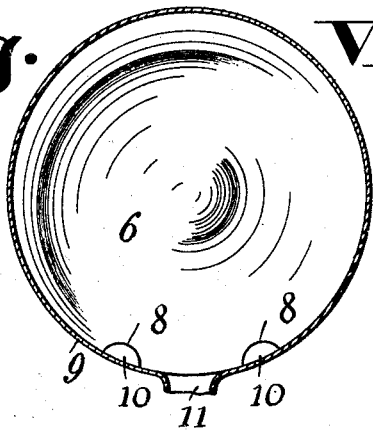
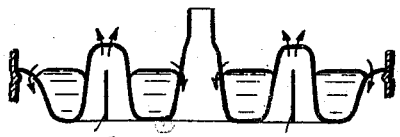
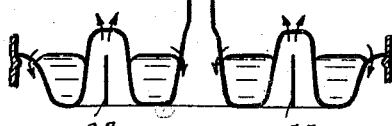
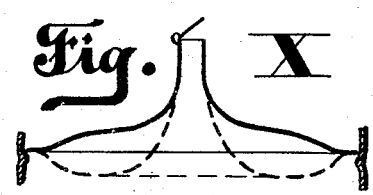
Witnesses:
F. T. Chapman
C. E. Marshall
Inventor:
Arthur Wright,
By Lyons & Bissing.
Attorneys.

No. 782,308. PATENTED FEB. 14, 1905.
A. WRIGHT.
ELECTROLYTIC APPARATUS.
APPLICATION FILED MAR. 23, 1903.
3 SHEETS—SHEET 3.
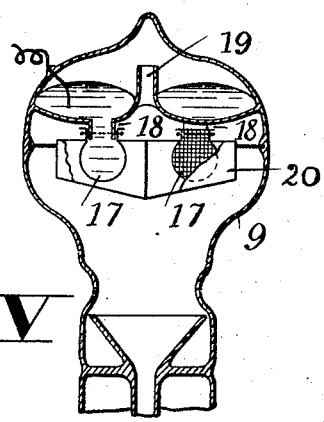
Fig. XV.
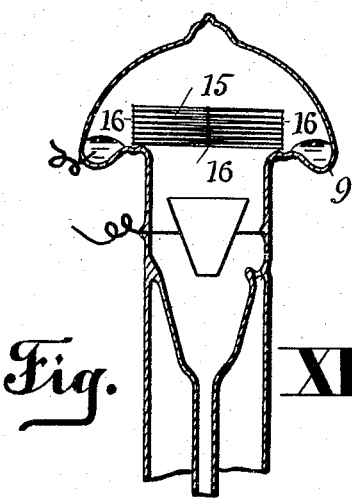
Fig. XIII.
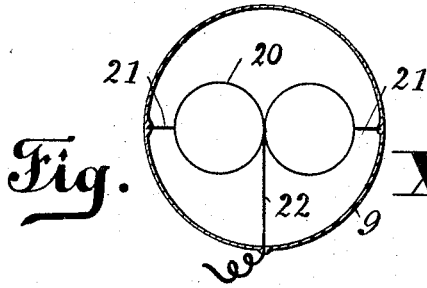
Fig. XVI.
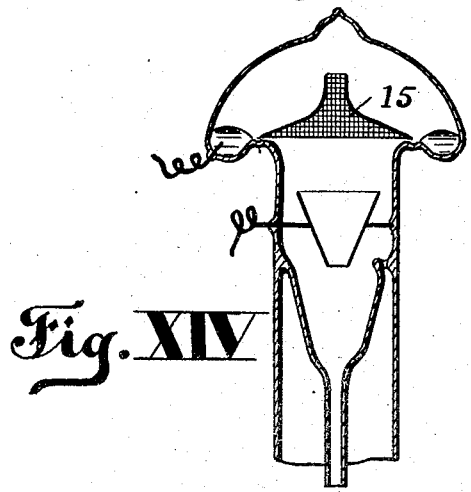
Fig. XIV.
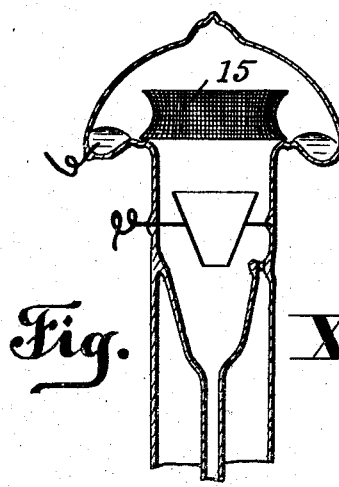
Fig. XII.
Witnesses:
F. T. Chapman
C. E. Marshall
Inventor:
Arthur Wright,
By Lyons & Bissing.
Attorneys.

No. 782,308. Patented February 14, 1905.

UNITED STATES PATENT OFFICE.

ARTHUR WRIGHT, OF BRIGHTON, ENGLAND.

ELECTROLYTIC APPARATUS.

SPECIFICATION forming part of Letters Patent No. 782,308, dated February 14, 1905.

Application filed March 23, 1903. Serial No. 149,160.

*To all whom it may concern:*

Be it known that I, ARTHUR WRIGHT, a subject of the King of Great Britain, and a resident of Brighton, England, have invented a new or Improved Device for Use in or with Electrolytic Apparatus, of which the following is a specification.

My invention relates to electrolytic apparatus, and in particular to a device, which for the purposes of this specification I shall term a "surface-tension grid," by means of which certain advantages are obtained especially in such electrolytic apparatus as mercury electrolytic meters.

It is well known that in electrolytic apparatus involving the use of mercury anodes there is a great tendency for the mercury to "sicken," as it is termed, this sickening being due to the formation of deposits on the surface of the mercury or at the edges where the mercury-surface and the containing vessel for the mercury meet. This drawback is believed to be due to the stagnation of the electrolyte at such points, and such stagnation is difficult or practically impossible to avoid on account of the fact that the support for containing or holding the mercury interferes with the washing action of the electrolyte over the surface of the mercury. I get over this difficulty by supporting the mercury constituting the anode not by a solid support, such as a spoon or pocket of glass, nor by a porous diaphragm, but by a device which, as above stated, I term a "surface-tension grid." A surface-tension grid is a support having orifices, which orifices would prevent the mercury being supported were it not that the grids are formed of such material as not to be wetted by mercury and were it not for the "surface tension" or "skin effect," as it is sometimes termed, of the mercury. This skin effect or surface tension is, as is well known, very great in the case of mercury as compared with ordinary liquids.

In practice I may form my surface-tension grids of platinum gauze or platinum-iridium gauze or perforated platinum or platinum-iridium sheet or foil or of close spirals or helices or other closely wound or bent shapes of platinum or platinum-iridium wire, or the grids may be of any other convenient material not wettable by mercury, and when it is desired that they should be conducting and are made of non-conducting material (such as spun-glass fabric or the like) I may insert platinum wires or other suitable conductors in the said grid in such manner that the said wires or conductors will make contact with the mercury. The action of such grids is as follows: When acting as a support for a globule or other mass of mercury, the grid is not wetted, and the surface tension of the mercury is such as to prevent it flowing through the interstices or orifices of the grid, provided that these are not too large. The effect is that instead of the upper surface of the mercury alone being washed by the currents set up in the electrolyte the under surfaces and sides are also washed by reason of the electrolyte having access to the mercury at the orifices or interstices of the grid.

In the accompanying drawings, Figure I shows diagrammatically a section of a grid and illustrates the washing action of the electrolyte above referred to. Figs. II, III, IV, and V represent in plan grids having rectilinear, radial, concentrically-curved, and spiral corrugations, respectively. Fig. VI represents a mercury electrolytic meter having a surface-tension grid in position. Figs. VII and VIII are respectively a plan and an elevation of the grid shown in Fig. VI. Fig. IX is a cross-section of a grid similar to that shown in Figs. VI, VII, and VIII, but having a central opening for resetting purposes, this central opening being fitted with a flap-valve. Fig. X shows a cross-section of a grid similar to that shown in Fig. IX, but having radial corrugations. Fig. XI shows in cross-section a grid differing from that shown in Fig. IX in that it has a concentric corrugation which admits of an annular cathode being employed at the same level as the anode. Fig. XII illustrates the employment of an annular gauze grid with an annular anode-chamber. Fig. XIII illustrates an annular grid similar to that shown in Fig. XII; but in this case it is formed of a close helix of wire instead of gauze. Fig. XIV shows a grid which differs from that shown in Fig. XII in that it is contracted to a narrow opening at the top. Figs.

XV and XVI illustrate a mercury electrolytic meter in which I use surface-tension grids of the forms of bags or cages.

In Fig. I the wave-line 1 1 represents a surface-tension grid, say, of platinum gauze of corrugated form, with pools of mercury 2 2 2 in the depressions of the said corrugations, these pools of mercury constituting an anode. For convenience of drawing I have not attempted to illustrate the orifices in the gauze. A reference to the arrows in this figure will show how the circulation of the electrolyte through the grids takes place, the said circulation being set up through the electrolyte becoming richer in mercury (and therefore heavier) at the anode and poorer in mercury (and therefore lighter) at the cathode when an electric current is passed. Thus in Fig. I let the circles 3 3 3 represent a cathode or cathodes. It will be seen by reference to the arrows 4 4 that currents of the electrolyte are set up in the electrolyte which will pass downward over the upper surfaces of the pools of mercury, washing the said upper surfaces, and then along the bottom of the said pools, washing the under surfaces, this washing effect on the under surfaces taking place through the apertures or orifices in the grid. At the same time currents will be set up over the cathode or cathodes 3, as shown by the arrows 5, so that a constant flow of electrolyte takes place, washing the anode-surfaces and keeping them free from crystallization. If instead of a surface-tension grid being employed a solid sheet—say of platinum-foil— were employed or if the support consisted of a porous diaphragm or of merely porous material, there would not be this washing effect and stagnation and consequent crystallization or sickening of the mercury would take place.

It will be seen that the access of the electrolyte to the mercury obtained by means of my surface-tension grids is quite different from what takes place in the case of a merely porous support, as in the latter there is no washing effect, and this washing effect seems to be necessary to the success of the operation involved.

In cases where the grid is placed horizontally I find it of advantage to make it of corrugated form, the said corrugations being, for example, rectilinear, spiral, concentrically-curved, radial, or the like. Such forms of grid are shown in Figs. II, III, IV, and V, the said grids differing merely in the direction of the corrugations. Thus in Fig. II the corrugations are rectilinear, in Fig. III radial, in Fig. IV concentrically curved, and in Fig. V spiral. I then place upon such grids a quantity of mercury insufficient to cover the tops of the ridges or corrugations, so that the mercury occupies the depressions or hollows, or the continuous hollow in the form of a spiral, or the like. In this way I provide for a free circulation of the electrolyte vertically through the grid, the electrolyte passing freely through the orifices or interstices at the tops of the ridges or corrugations which are left uncovered by the mercury.

As I have previously stated, my invention is specially though not exclusively applicable in the case of mercury electrolytic meters, and I shall now proceed to describe certain forms of grid suitable for this particular application. These forms of grid I shall show as applied to an electric meter of the mercury electrolytic type. Fig. VI shows a meter of this type having a grid 6 therein, which is shown in cross-section in the said figure, in plan in Fig. VII, and in elevation (looking from the right of Fig. 6) in Fig. VIII. In these three figures it will be seen that the grid is more or less cup-shaped, but with the center deeply dished upward, so to form a central cone 7, the apex of which projects above the level of the anode-mercury. This admits of an upward circulation of the electrolyte at the apex, while at the same time the upper and lower surfaces of the mercury are washed.

8 8 are two upward extensions of the grid, their form being best shown in Fig. VII, where they are seen in plan as bent or curved in such manner that when placed in contact with the glass walls 9 of the meter they form tubular passages 10. The object of these passages is to permit of ready resetting, so that by merely turning the instrument upside down the mercury may be caused to flow from the depositing tube or receptacle back to the anode-chamber and anode-feeder through the said tubular passages. The said depositing tube or receptacle, the anode-chamber, and the anode-feeder will be found fully described in the United States patent granted to the Mutual Electric Trust Limited, No. 702,844, dated June 17, 1902. The grid shown is cut away at the part 11 in order to permit of the free access of the mercury from the anode-feeder to the anode-chamber.

In Fig. IX, I show a grid in cross-section which is somewhat similar to that shown in Figs. VI, VII, and VIII, except that the cone 7 instead of being closed is open at the top and is there furnished with a hinged flap or valve 13—for example, of platinum gauze— opening upward. It also differs in that the extension-pieces 8 8 are suppressed, these being no longer necessary, as the instrument can be easily reset by the mercury passing through the said cone and valve instead of through the passages 10, as in the previous case. When the instrument is placed upright after resetting, the flap falls back, so as to close the top of the cone again. This flap or valve is not a necessary feature of this form of grid, as it may easily be dispensed with, provided that the top of the conical passage is well above the level of the mercury. It is, however, useful in cases where there may be excessive concussion or vibration.

In Fig. X, I show in section a form of grid resembling that shown in Fig. IX, except that it has radial corrugations, these corrugations causing the mercury to lie upon the grid in separate pools instead of lying in one annular pool, as in the cases illustrated in Figs. VI to IX, inclusive. In practice it is advantageous to make the body of the grid more or less cup-shaped, as shown in Fig. IX, rather than flat, (I am neglecting the question of corrugations at present,) for in the case of a flat grid the mercury lies or may lie in contact with the glass sides of the vessel where stagnation may take place, whereas when the grid is sufficiently cupped, as in Fig. IX, the mercury is washed at all parts. The arrows indicate the circulation of the electrolyte.

In Fig. XI, I show a form of grid which differs from that shown in Fig. IX merely in the fact that it is provided with concentric corrugations, the ridges projecting above the surface of the mercury. This is a very convenient type of grid, inasmuch as it admits of an annular cathode being employed at the same level as the anode. In the case illustrated this cathode consists of a vertically flat ring 14.

Another way of employing a surface-tension grid is to make it of the form of an annular collar, which will project above the tubular part of the glass where the latter is bent round to constitute the annular anode-chamber. Such a grid is shown at 15 in Fig. XII. In the precise form illustrated it will be seen that the grid does not fulfil the full function that it does in the cases hereinbefore illustrated, inasmuch as it does not act as a support for the mercury anode. It serves this useful function, however, that it permits ready access of the electrolyte to the upper surface of the mercury, while it prevents the mercury being shaken out of the anode-chamber. This form of grid is only intended for use in cases where there is sufficient circulation of the electrolyte produced by the level of the mercury anode being well above that of the cathode, and in cases where there is considerable vibration or where the instrument is required to be readily portable.

In Fig. XIII, I illustrate a grid similar to that in Fig. XII, except that instead of being formed of gauze it is formed of a helix of wire, which helix is strengthened by upright wires 16 when desired. Beads of conducting or non-conducting material might be strung on the wire to alter the interstitial space.

In Fig. XIV, I show a form of grid differing from that shown in Fig. XII merely in the fact that it is contracted to a narrow opening at the top.

In Figs. XII, XIII, and XIV the grid is used simply as a protecting device and not as a support; but it will be seen that if a larger amount of mercury were in the anode-chamber the grids would fulfil the functions of a partial support, as well as of a device for preventing the mercury being shaken over into the depositing-tube.

In Fig. XV, I show grids consisting of two bags or cages 17 17, this form of grid being useful in the case of meters of a certain form. Here an annular glass anode-support is employed, as shown, and having two downwardly-extending tubes 18 18, the said tubes terminating in the gauze bags 17. 19 is a glass resetting-tube.

20 is a platinum-foil cathode of figure-8 form, which is shown more clearly in plan in Fig. XVI. In the latter figure, 21 21 are supports for the cathode, and 22 is the platinum wire connecting the cathode with the exterior of the instrument.

In the case of electrolytic mercury-meters of the type set forth I find that platinum-gauze having a hundred meshes to the linear inch gives good results in practice. In other cases the gauze to be employed or the size to be given to the orifices in the case of a grid other than of gauze can easily be determined by the following considerations: The greater the depth of mercury upon the grid the smaller must be the orifices. The greater the vibration to which the mercury is exposed the smaller should be the orifices. The orifices or meshes should further be of very uniform size, for just as a long chain is no stronger than its weakest link so the supporting efficiency of a grid will depend upon its largest orifice. Again, when the grid is made of such a material as spun-glass gauze its strength as compared with the weight of mercury to be supported must be carefully considered. These considerations will enable any one to select a suitable grid for any definite purpose, whether it be for an electricity-meter or any other electrolytic apparatus.

Having thus described my invention, what I claim as new, and desire to secure by Letters Patent, is—

1. In an electrolytic apparatus with a mercury anode, a screen separating the anode from the cathode consisting of a material which is not wetted by mercury and has passages of such size as will prevent the flow therethrough of the mercury but will permit the free flow of the electrolyte, substantially as described.

2. In an electrolytic apparatus with a mercury anode, a support or receptacle for the mercury consisting of material which is not wetted by mercury and has passages of such size as prevent the flow therethrough of mercury but permit the free flow of an electrolyte, substantially as described.

3. In an electrolytic apparatus with a mercury anode, a support or receptacle for the mercury consisting of a sieve of a material which is not wetted by mercury, the sieve-passages being small enough to prevent mercury from flowing therethrough but wide enough to permit the free passage of an electrolyte, substantially as described.

4. In an electrolytic apparatus with a mercury anode, a support or receptacle for the mercury consisting of a meshed fabric of a metal which is not wetted by mercury, the meshes being small enough to prevent mercury from flowing therethrough but wide enough to permit the free passage of an electrolyte, substantially as described.

5. In an electrolytic apparatus with a mercury anode, a support or receptacle for the mercury consisting of a meshed fabric of platinum, the meshes being so small as to prevent mercury from flowing therethrough but wide enough to permit the free passage of an electrolyte, substantially as described.

6. In an electrolytic apparatus with a mercury anode, a support or receptacle for the mercury consisting of a corrugated support, receiving mercury in its depressions only, and made of a material that is not wetted by mercury and having passages which are too small to permit mercury to flow through but which are wide enough to permit the free flow through them of an electrolyte, substantially as described.

7. A mercury electrolytic meter consisting of a chamber divided in two parts by a sieve-like mercury-receptacle made of a material which is not wetted by mercury and the sieve-openings of which are so small as to prevent the flow therethrough of mercury while permitting the free flow of the electrolyte, said sieve being corrugated to receive mercury in its depressions only and is formed with a channel or channels which permit the electrolytically-deposited mercury to be returned to the receptacle, substantially as described.

In witness whereof I have hereunto set my hand in presence of two witnesses.

ARTHUR WRIGHT.

Witnesses:
CHARLES F. KIFF,
LIONEL BAIRD.